United States Patent
Craig

[11] 3,714,413
[45] Jan. 30, 1973

[54] ANTI-GLARE LIGHT BOX
[75] Inventor: Dwin R. Craig, Gaithersburg, Md.
[73] Assignee: Dynatronics, Inc., Washington, D.C.
[22] Filed: Nov. 15, 1971
[21] Appl. No.: 198,533

Related U.S. Application Data

[63] Continuation-in-part of Ser. No. 805,693, March 10, 1969, Pat. No. 3,621,231.

[52] U.S. Cl. ............240/9.5, 350/147, 350/156, 350/159, 355/71
[51] Int. Cl. ...........................................F21u 9/00
[58] Field of Search ....355/18, 71; 240/9.5; 350/147, 350/156, 159

[56] References Cited

UNITED STATES PATENTS

| | | | |
|---|---|---|---|
| 3,062,087 | 11/1962 | Zandman et al. | 355/71 |
| 3,480,365 | 11/1969 | Ooue et al. | 355/71 |
| 3,506,333 | 4/1970 | Land | 350/157 |

Primary Examiner—Samuel S. Matthews
Assistant Examiner—Richard A. Wintercorn
Attorney—Elton H. Brown, Jr.

[57] ABSTRACT

An anti-glare light box is provided with a right hand and a left hand circular polarizer arranged in spaced relation over the lights of the light box. The material being viewed by being positioned between the polarizers is printed on a base which either possesses optical activity such that it will rotate the planes of polarization of the lowermost polarizer 90° so that the light will then pass through the second polarizer, or is a depolarizer and depolarizes the light from the first polarizing screen so that it can pass through the second polarizing screen.

3 Claims, 4 Drawing Figures

PATENTED JAN 30 1973

3,714,413

ANTI-GLARE LIGHT BOX

CROSS-REFERENCE TO RELATED APPLICATION

The application is a Continuation-in-part of my copending application, Ser. No. 805,693 filed Mar. 10, 1969, and titled "Anti-Glare Light Box" now U.S. Pat. No. 3,621,231.

BACKGROUND OF THE INVENTION

The present invention relates to light boxes of the type wherein a drawing or photograph is placed on the light transmitting surface arranged so that light is transmitted through the object to be viewed. In ordinary light boxes the area surrounding the object being viewed causes a glare on the user's eyes such as to prohibit normal comfortable viewing. With the present invention only circularly polarized light passing through the depolarizer substrate or the substrate involving optical activity shines through the light screen with the extraneous light being intercepted and blocked by the upper circularly polarized screen.

DESCRIPTION OF THE PRIOR ART

In prior art devices, in order to eliminate the glare mentioned above, special masks were used to block the light surrounding the film to be read and when changing the size of the object to be read it was necessary that the mask also have its size changed to fit the new object being read.

SUMMARY OF THE INVENTION

The present invention consists of a conventional light box containing fluorescent or incandescent light bulbs and a window wall through which the light shines in order to back light an object placed thereon. The window wall contains either a left or right hand circular polarizing screen.

A drawing to be read is supported on the left or right hand circular polarized and a second polarizer is positioned above the drawing. The second polarizer is also either a left or right hand circular polarizer but of opposite hand to the first polarizer screen. The film on which the drawing is printed is one enjoying optical activity such that the lines of polarization are rotated 90° so that they will pass through the second polarizer screen with a very sharp contrast. Extraneous light not passing through the film is completely blocked by the arrangement of polarizing filters and no glare is then produced. In a modified form of the invention the substrate on which the drawing is produced is of a depolarizing nature so that polarized light passing through the depolarizer will then be projected through the second polarizing screen. As in the case of the film, light which is not going through the depolarizer screen will be intercepted by the pair of polarizers.

BRIEF DESCRIPTION OF THE DRAWINGS

Reference is now made to the drawings wherein.

DESCRIPTION OF THE PREFERRED EMBODIMENTS

Figure 1:
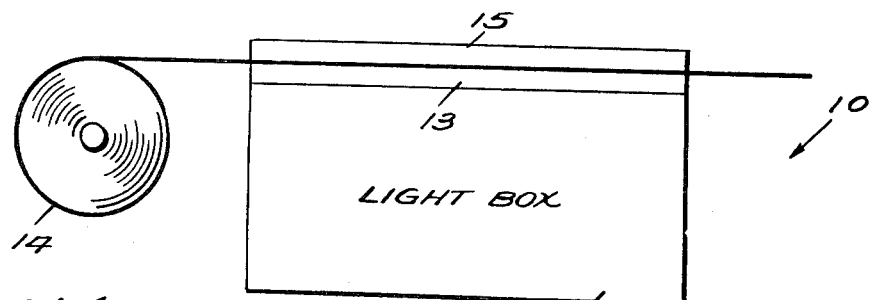
FIG. 1 is a side elevation of the invention.
Figure 2:
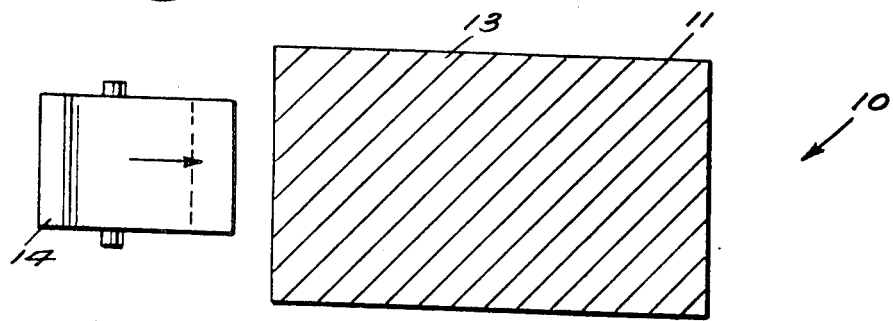
FIG. 2 is a top plan view of the invention showing the lower polarizer screen in place.

Referring now to the drawings in detail wherein like reference characters indicate like parts throughout the several figures, the reference numeral 10 indicates generally a light box constructed in accordance with the invention.

The light box 10 includes a generally rectangular box structure 11 containing incandescent or fluorescent lights (not shown), which may be controlled by any suitable means. The light box 10 has a left hand circular polarizing filter 13 on the upper surface thereof.

Figure 3:
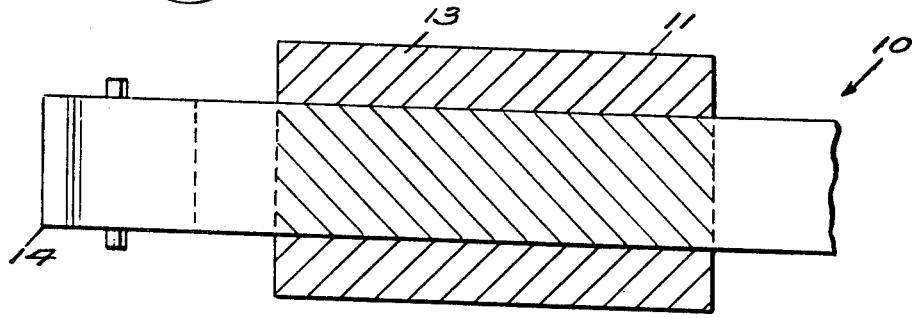
FIG. 3 is a top plan view of the invention with the lower polarizer screen in place and the film positioned in overlying relation thereto.
Figure 4:
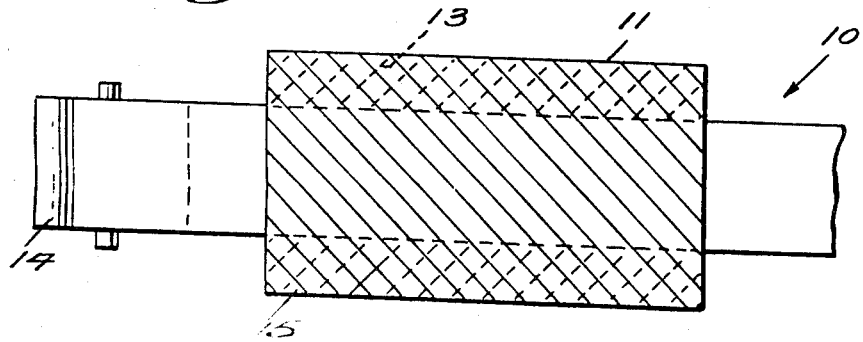
FIG. 4 is a top plan view of the invention with the polarizer screen underlying the film and a second polarizer screen overlying the film.

A roll of photographic film 14 is positioned adjacent the box 10 and arranged to be unrolled with the film overlying the polarizer filter 13. The film base of the photographic film 14 is selected so as to have optical activity and can consist of a polyester such as "Mylar," "Estar," "Plestar" or "Cellophane." The term "optical activity" as used herein indicates the ability to rotate the plane of polarization as is illustrated in FIG. 3 with the polarizer filter 13 in place and the film 14 overlying it.

A right hand circular polarizing filter 15 is positioned to overlie the film 14 and the polarizer filter 13.

With the filter 13 and the filter 15 in the positions illustrated all light passing through the left hand circular polarizer filter 13 is polarized and with the filter 15 being a right hand circular polarizer this light can not pass through the filter 15. When the film 14 is positioned between the filters 13 and 15, the plane of polarization of the filter 13 is rotated so that it may then pass through the filter 15 and light which passes through the filter 13 and the film 14 can then pass through the filter 15. Obviously, extraneous light which does not pass through the film 14 will be intercepted by the filter 15 and all glare will thus be eliminated.

In a modified form of the invention, a depolarizing tracing paper is substituted for the film 14 and light shining through the filter 13 will be depolarized as it passes through the tracing paper and will then be passed through the polarizer filter 15 with extraneous light being intercepted in the same manner as described in the use of the film.

Optical activity as used herein is fully described in the "Fundamentals of Physical Optics," published by McGraw-Hill Book Company, Incorporated, in 1937. Chapter 17 in this book is devoted to optical activity.

The circular polarizing filters described above are manufactured by the Polaroid Corporation under the name "HNCP 37 Left Hand" and "HNCP 37 Right Hand." These circular polarizing filters include a linear polarizing element and a quarter wave retardation filter which rotates the light passing therethrough 45°. Light passing through either a right or left hand circular polarizer will be intercepted by the opposite circular polarizer filter.

Having thus described the preferred embodiments of the invention, it should be understood that numerous structural modifications and adaptations may be resorted to without departing from the spirit of the invention.

What is claimed is:

1. An anti-glare light box comprising a receptacle having an source of illumination therein, a circular polarizing filter overlying an open top of said receptacle with light from said source of illumination being adapted to pass therethrough, a second opposite circular polarizing filter arranged in vertically spaced generally parallel relation to said first filter and non-polarizing means positioned between said first and said second filters for altering at least a portion of the light passing through said first filter to enable it to pass through said second filter, said last named means being either a transparent optically active film having the property of rotating by 90° the plane of polarization of polarized light passing therethrough, or paper having the property of depolarizing polarized light passing therethrough, whereby light passing through said first polarizing filter then through said means passes through said second polarizing filter and light passing through said first polarizing filter but not passing through said means is intercepted by said second polarizing filter.

2. A device as claimed in claim 1 wherein said optically active film is formed of polyester.

3. A device as claimed in claim 1 wherein the depolarizing filter is a tracing sheet.

* * * * *